May 26, 1959  D. L. JAFFE  2,888,653
ADJUSTING AND INDICATING COMBINATION
Filed June 7, 1954
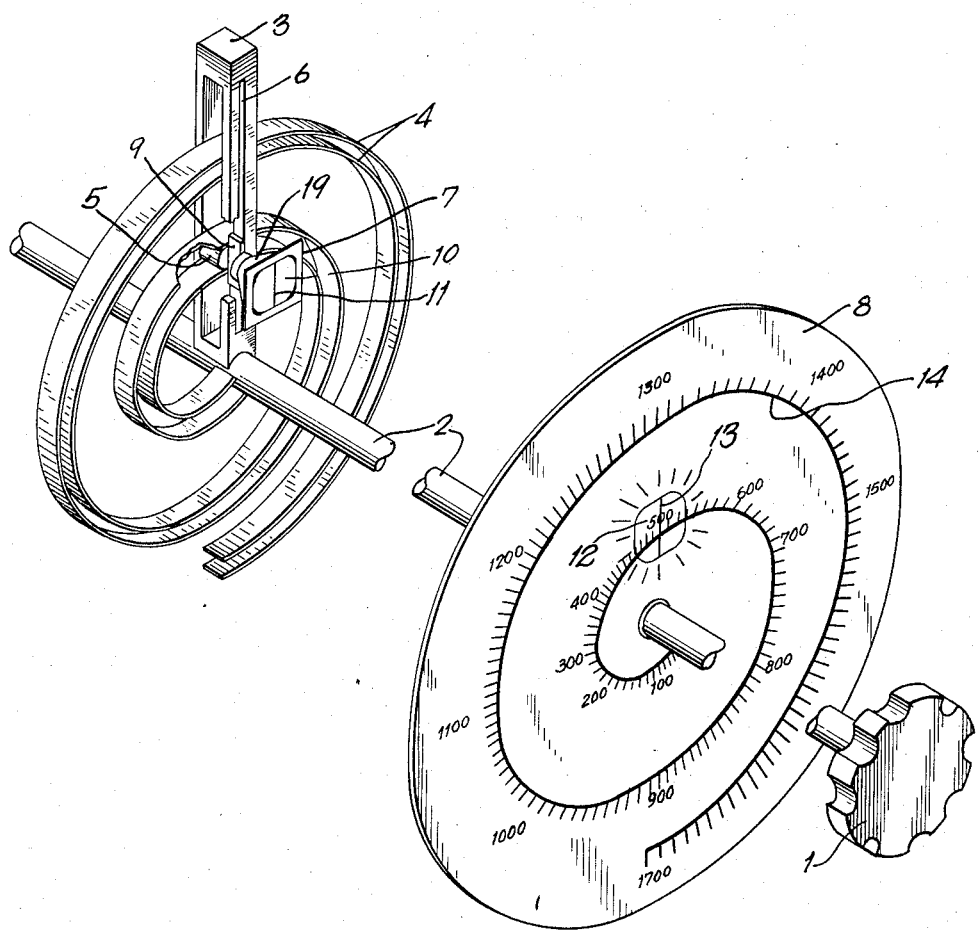
INVENTOR.
D. LAWRENCE JAFFE
BY Darby + Darby
ATTORNEYS

United States Patent Office 2,888,653
Patented May 26, 1959

2,888,653
ADJUSTING AND INDICATING COMBINATION

David Lawrence Jaffe, Great Neck, N.Y., assignor to Polarad Electronics Corporation, Brooklyn, N.Y., a corporation of New York Application June 7, 1954, Serial No. 434,800

3 Claims. (Cl. 333—82)

This invention consists of a novel combination comprising cooperating means to adjust the effective value of an electrical component and to indicate each adjusted value.

A broad object of the invention is to provide, in compact form, a relatively elongated electrical component, such as a transmission line, inductor or resistor, the operative value of which may be adjusted, and a visual indicator including a calibrated dial, for indicating those adjusted values without the use of a speed reduction device such as gear trains, pulleys and similar mechanisms.

More specifically this invention comprises a combination of a mechanically actuated adjusting device for the electrical component, a visual dial, and means operated conjointly with the adjusting device to provide a highly resolved indication of such adjustments.

A still more specific object of the invention is to provide an adjustable component in the form of a spiral, a visual dial having a scale also in spiral form, means for projecting an indexing mark onto said dial, and mechanically interconnecting means for adjusting the value of the electrical component and proportionately positioning the index mark on the spiral scale.

Other and more detailed objects of the invention will be apparent from the following description of the embodiment thereof illustrated in the attached drawings.

In the accompanying drawings, the single figure is a perspective view of the assembly comprising the combination of this invention.

The specific example illustrated in the accompanying drawings will be discussed as explanatory of the nature of the invention. There is shown in the drawings a wide range radio frequency tuning mechanism which includes a variable inductance or transmission line of relatively elongated configuration arranged in the form of a spiral. A manually movable short-circuiting member, movable in a spiral path, operates to interconnect the conductive pair comprising the transmission line at various points along its length. In association therewith is a translucent or transparent dial which is fixed with relation to the transmission line and has impressed thereon, in any suitable manner, a calibration likewise arranged in a spiral configuration which is geometrically a projection of the transmission line. A mechanism is provided for effecting movement of the interconnecting element along the spiral transmission line, and there is provided means moving with said interconnecting member in such a way as to cast an indexing shadow on the calibration curve at points corresponding to all positions of the interconnecting member. As will appear hereinafter, this is accomplished without the usual complication of speed reduction devices. An important advantage of this arrangement is the physical compression of the parts into a relatively small, compact area, while attaining considerable resolution of the indications which, of course, makes for accuracy of reading.

Referring to the drawing, in more detail, there is illustrated at 4 a pair of conductors, arranged to provide a pair of parallel spiral configurations. Positioned in front of these conductors is a dial 8 of translucent or transparent material having impressed thereon in any suitable manner and properly graduated, a calibration arranged in spiral form. In use the dial 8 is fixed. Extending through the center of the dial and of the conductors 4, is a rotatable shaft 2, having a knob 1 on the end which projects through the dial 8 and by means of which the shaft 2 is rotated. Secured to the shaft 2 in the plane of the conductors 4 is a fixture 3 which is secured at its inner end to the shaft 2 for rotation by it.

In cross-section the fixture 3 is rectangular and it has a rectangular slot 16 extending through it in the plane of the conductors 4 and of substantially the same width, as shown. The front wall of the fixture 3 is provided with a slot 6 lying in a plane at right angles to the first slot 16. The slot 6 passes entirely through the front wall of the fixture 3 so as to communicate with the first slot 16. At 5 is the interconnecting element which may have any suitable form, but which is preferably, as shown, in the form of a plate arranged to travel in a spiral path between the conductors 4.

The interconnecting element 5 is attached to a key 9, which is slidably mounted in the slot 6. The key 9 and contact element 5 are rigidly connected together to cause radial movement, as a unit, with respect to the spiral conductors 4. The element 5, of course, has a radial width great enough to cause electrical interconnection between the adjacent surfaces of the conductors 4. Mounted on the key 9 is a housing 19 of suitable configuration in which is mounted a light source. It is of course understood that an energizing battery can be exterior of the housing 19 and mounted at some fixed point with interconnection to the light source in the housing 19 by means of suitable flexible conductors, not shown. The housing 19 is provided with a cover having a light-transmitting window 10 which may be of glass, plastic or the like, on which is inscribed or otherwise placed, an indexing line or mark 11 which is in longitudinal alignment with the center of the interconnecting element 5.

In the operation of this device it will be at once apparent that with rotation of shaft 2, the fixture 3 will be caused to rotate in the plane of the double conductor spiral 4. The conductors 4 are, of course, fixed against relative movement, or movement as a unit, with the result that as the fixture 3 revolves it will carry the contact element 5 with it. The conductors 4 will act as cams to cause the interconnecting contact element 5 to travel in a spiral path, thereby causing radial reciprocation of the key 9 in the slot 6. Since the contact element 5, key 9 and unit 19, 10 and 11 are all mechanically connected together, they likewise will travel in a spiral path. The fixed dial 8, lying parallel to the plane of the conductors 4, will therefore have projected upon it a spot of light which has been indicated by the reference character 12, which spot will be intersected by the shadow 13 of the index mark 11. It is apparent, therefore, that as the contact element 5 moves along the spiral conductors 4, it will cause the index mark 11 to cast its shadow 13 at the corresponding point on the spiral calibration 14. The arrangement is such that the index mark 13 will always lie radially of shaft 12.

In the particular arrangement illustrated it is apparent that the contact element 5 will short-circuit or interconnect the two conductors 4 at various points along its length, thereby changing their electrical characteristics. The shadow 13 of the index mark 11 with an appropriately calibrated scale, accurately indicates the various adjusted values of the conductors 4.

It is apparent that by thus arranging the parts a relatively elongated electrical unit can be compacted into a small space, and there can be associated with it a calibration scale of equal physical length, thereby insuring accurate resolution of the indications. The mechanical arrangement of the parts is such that a very simple structure is provided without the usual complication of speed reduction devices, in order to convert the mechanical movements of the adjusting device into visual indications.

From the above description it will be apparent to those skilled in the art that the subject matter of this invention is capable of considerable variation in detail, and I prefer, therefore, not to be limited to the embodiment of the invention selected for illustrative purposes, but only as required by the appended claims.

What is claimed is:

1. An adjustable transmission-line-type resonant circuit and indicator therefor comprising a pair of flat conductors constituting said transmission line and arranged in parallel spiral configuration, a shaft along the axis of said spiral configuration, a guide member secured to said shaft and extending radially thereof and having a radial slot adjacent the plane of said conductor spiral, a movable short-circuiting member extending between said parallel conductors in a radial direction, a key slidable within said slot and rigidly secured to said short-circuiting member, whereby upon rotation of said shaft said slotted guide member causes said key to be moved in the plane of said slot, said short-circuiting member being thereby caused to move along said spiral configuration by camming action of said conductors, means secured to said key and short-circuiting member and movable therewith for producing an indexing light image parallel to said guide member and for projecting said image axially along said shaft, and a fixed dial in the path of said image projection and having spirally arranged indicia forming a projection of said spirally arranged conductors, whereby as said shaft is turned the effective length of said transmission line conductors is varied to adjust the resonant frequency of said circuit and said projected image simultaneously and correspondingly travels along said spirally arranged indicia while remaining always radial of said dial.

2. An adjustable transmission-line-type resonant circuit and indicator therefor comprising a pair of flat conductors constituting said transmission line and arranged in parallel spiral configuration, a shaft along the axis of said spiral configuration, a guide member secured to said shaft and extending radially thereof and having a radial slot adjacent the plane of said conductor spiral, a movable short-circuiting member extending between said parallel conductors in a radial direction, a key slidable within said slot and rigidly secured to said short-circuiting member, whereby upon rotation of said shaft said slotted guide member causes said key to be moved in the plane of said slot, said short-circuiting member being thereby caused to move along said spiral configuration by camming action of said conductors, means secured to said key and short circuiting member for producing a light image and projecting said image in a direction parallel to said shaft, said means comprising a light source, a mask in front of said light source having an opening therein and a hairline extending across said opening and in a direction radially from said shaft, and a fixed dial in the path of said image projection and having spirally arranged indicia forming a projection of said spirally arranged conductors, whereby as said shaft is turned the effective length of said transmission line conductors is varied to adjust the resonant frequency of said circuit and said projected image simultaneously and correspondingly travels along said spirally arranged indicia while remaining always radial of said dial.

3. An adjustable transmission-line-type resonant circuit and indicator therefor comprising a pair of flat conductors constituting said transmission line and arranged in parallel spiral configuration, a shaft along the axis of said spiral configuration, a guide member secured to said shaft and extending radially thereof, a movable short circuiting member extending between said parallel conductors and secured to said guide member for sliding movement therealong in a radial direction, said short circuiting member being thereby caused to move along said spiral configuration by camming action of said conductors, means secured to said short circuiting member and movable therewith for producing an indexing light image and for projecting said image axially along said shaft, means for securing said image producing means to prevent rotation thereof while allowing sliding movement along said guide member, said indexing light image being thereby retained in parallel relationship to said guide member, and a fixed dial in the path of said image projection and having spirally arranged indicia forming a projection of said spirally arranged conductors, whereby as said shaft is turned the effective length of said transmission line conductors is varied to adjust the resonant frequency of said circuit and said projected image simultaneously and correspondingly travels along said spirally arranged indicia while remaining always radial of said dial.

References Cited in the file of this patent

UNITED STATES PATENTS

| 2,126,541 | De Forest | Aug. 9, 1938 |
| 2,575,856 | Ware | Nov. 20, 1951 |